(12) United States Patent
Yang et al.

(10) Patent No.: US 11,423,774 B2
(45) Date of Patent: Aug. 23, 2022

(54) ROAD CONDITION GENERATION METHOD, APPARATUS AND DEVICE, AND STORAGE MEDIUM

(71) Applicant: TENCENT TECHNOLOGY (SHENZHEN) COMPANY LIMITED, Shenzhen (CN)

(72) Inventors: Yong Yang, Shenzhen (CN); Liguang Sun, Shenzhen (CN); Hongchao Zhao, Shenzhen (CN); Hongying Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 365 days.

(21) Appl. No.: 16/659,138

(22) Filed: Oct. 21, 2019

(65) Prior Publication Data
US 2020/0051428 A1 Feb. 13, 2020

Related U.S. Application Data

(63) Continuation of application No. PCT/CN2018/112322, filed on Oct. 29, 2018.

(30) Foreign Application Priority Data

Dec. 13, 2017 (CN) .......................... 201711335748.7

(51) Int. Cl.
*G08G 1/01* (2006.01)
*G06N 7/00* (2006.01)
(Continued)

(52) U.S. Cl.
CPC .......... *G08G 1/0141* (2013.01); *G06N 7/005* (2013.01); *G06Q 10/04* (2013.01); *G08G 1/012* (2013.01); *G08G 1/0129* (2013.01); *G06Q 50/30* (2013.01)

(58) Field of Classification Search
CPC .... G08G 1/0141; G08G 1/012; G08G 1/0129; G08G 1/09675; G08G 1/0133;
(Continued)

(56) References Cited

U.S. PATENT DOCUMENTS

2007/0208492 A1 9/2007 Downs et al.

FOREIGN PATENT DOCUMENTS

| CN | 101118693 A | 2/2008 |
| CN | 103186986 A | 7/2013 |

(Continued)

OTHER PUBLICATIONS

Yan et al., "A Hidden Markov Model for short term prediction of traffic conditions on freeways", Transportation Research Part C: Emerging Technologies vol. 43, Part 1, Jun. 2014, pp. 95-111 (Year: 2014).*

(Continued)

*Primary Examiner* — Yuen Wong
(74) *Attorney, Agent, or Firm* — Anova Law Group, PLLC

(57) ABSTRACT

A road condition generation method is provided for a computing device. The method includes obtaining current driving state information; based on the current driving state information, generating road condition state information according to transition information between road condition states extracted from historical road condition data and a correspondence between the road condition states and road section traffic capacity information; and outputting the road condition state information.

12 Claims, 8 Drawing Sheets

Hidden state 1   Hidden state 2   Hidden state 3

Hidden state 4   Visible observation

→ State transition    ⇒ Observation sequence (spatial)    ⇒ Output probability

(51) Int. Cl.
*G06Q 10/04* (2012.01)
*G06Q 50/30* (2012.01)

(58) Field of Classification Search
CPC ........... G08G 1/096775; G08G 1/0112; G06N 7/005; G06Q 10/04; G06Q 50/30; G07C 5/08
See application file for complete search history.

(56) References Cited

FOREIGN PATENT DOCUMENTS

| | | | | |
|---|---|---|---|---|
| CN | 103745106 A | | 4/2014 | |
| CN | 104835319 A | * | 8/2015 | ........... G05D 1/0297 |
| CN | 103700259 B | | 8/2016 | |
| CN | 106652441 A | | 5/2017 | |
| CN | 106855878 A | * | 6/2017 | |

OTHER PUBLICATIONS

The State Intellectual Property Office of the People's Republic of China (SIPO) Office Action 1 for for 201711335748.7, dated Sep. 24, 2021 7 Pages (including translation).
The World Intellectual Property Organization (WIPO) International Search Report for PCT/CN2018/112322 dated Dec. 27, 2018 5 Pages (including translation).

\* cited by examiner

ROAD CONDITION GENERATION METHOD, APPARATUS AND DEVICE, AND STORAGE MEDIUM

RELATED APPLICATIONS

This application is a continuation application of PCT Patent Application No. PCT/CN2018/112322, filed on Oct. 29, 2018, which claims priority to Chinese Patent Application No. 201711335748.7, entitled "ROAD CONDITION GENERATION METHOD, AND RELATED APPARATUS AND DEVICE" filed on Dec. 13, 2017, content of all of which is incorporated by reference in its entirety.

FIELD OF THE TECHNOLOGY

Embodiments of the present disclosure relate to the field of computers and, in particular, to a road condition generation method, apparatus, and device, and a storage medium.

BACKGROUND

In a map service, real-time traffic condition information, as a fundamental function, can not only make it easy for users to know about the degree of road congestion, plan travel routes and properly arrange travel plans, but also help build a traffic warning system for a city and assist in dispatching of an urban transportation system. With accurate road conditions, a better estimated time of arrival (ETA) service and better path planning can be provided, thus saving urban road resources and saving time for users.

SUMMARY

According to one aspect of the present disclosure, a road condition generation method is provided for a computing device. The method includes obtaining current driving state information; based on the current driving state information, generating road condition state information according to transition information between road condition states extracted from historical road condition data and a correspondence between the road condition states and road section traffic capacity information; and outputting the road condition state information.

According to another aspect of the present disclosure, a road condition generation device is provided. The device includes a memory configured to store program code; an input device and an output device; and a processor connected to the input device, the output device, and the memory. The processor is configured to execute the program code to perform: obtaining current driving state information; based on the current driving state information, generating road condition state information according to transition information between road condition states extracted from historical road condition data and a correspondence between the road condition states and road section traffic capacity information; and outputting the road condition state information.

According to another aspect of the present disclosure, a non-transitory computer-readable storage medium is provided. The non-transitory computer-readable storage medium stores computer program instructions executable by at least one processor to perform: obtaining current driving state information; based on the current driving state information, generating road condition state information according to transition information between road condition states extracted from historical road condition data and a correspondence between the road condition states and road section traffic capacity information; and outputting the road condition state information.

Other aspects of the present disclosure can be understood by those skilled in the art in light of the description, the claims, and the drawings of the present disclosure.

BRIEF DESCRIPTION OF THE DRAWINGS

To describe the technical solutions in the embodiments of the present disclosure more clearly, the following briefly describes the accompanying drawings required. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
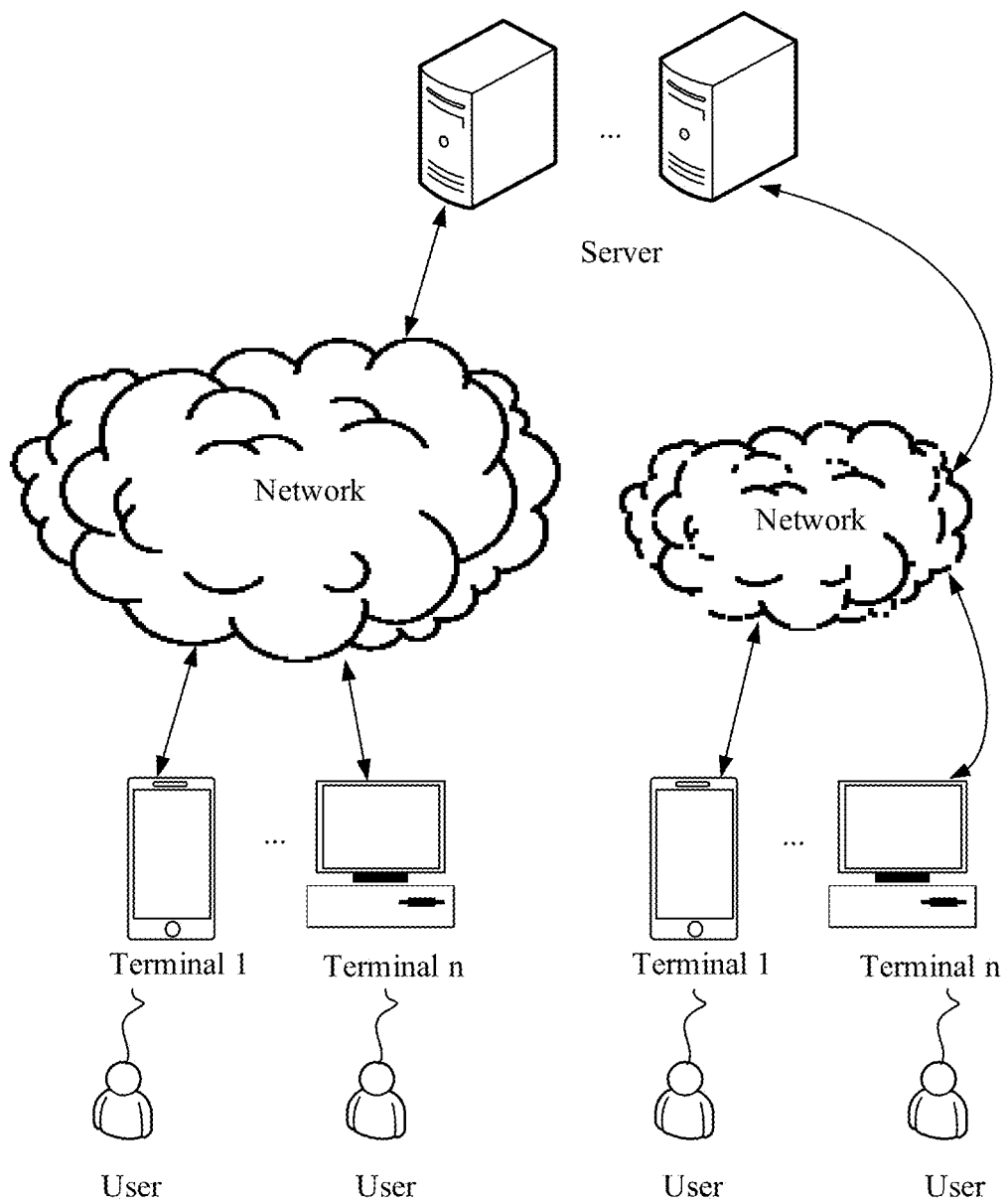
FIG. 1 is a schematic diagram of a system architecture of a road condition generation method according to an embodiment of the present disclosure.

Technical solutions in the embodiments of the present disclosure are described below with reference to the accompanying drawings.

The terms "include" and "comprise", when used in this specification and the appended claims, specify the presence of stated features, entities, steps, operations, elements, and/or components, but do not exclude the presence or addition of one or more other features, entities, steps, operations, elements, components, and/or combinations thereof.

The terminology used in the specification of the present disclosure is for the purpose of describing specific embodiments only and is not intended to limit the present disclosure. As used in the specification of the present disclosure and the appended claims, the singular forms "a", "an" and "the" are intended to include the plural forms as well, unless the context clearly indicates otherwise.

The term "and/or" used in the specification of the present disclosure and the appended claims indicates any or all possible combinations of one or more associated listed items, and includes these combinations.

As used in the specification and the appended claims, the term "if" can be interpreted as "when", "once", "in response to determining" or "in response to detection" according to the context. Similarly, the phrase "if determining" or "if [the described condition or event] is detected" can be interpreted as "once determining", "in response to determining", "once [the described condition or event] is detected", or "in response to detection of [the described condition or event]" according to the context.

In specific implementation, the terminal described in the embodiments of the present disclosure includes, but is not limited to, a mobile phone having a touch-sensitive surface (such as a touch screen display and/or a touch pad), a laptop computer, a tablet computer or another portable device. In some embodiments, the device is not a portable communications device, but a desktop computer having a touch-sensitive surface (such as a touch screen display and/or a touch pad).

In the following discussion, a terminal including a display and a touch-sensitive surface is described. However, the terminal may include one or more other physical user interface devices of a physical keyboard, a mouse and/or a controller lever.

Most map manufacturers currently calculate real-time speed of vehicles on each road section by acquiring global positioning system (GPS) anchor point information of vehicles on the road, and integrate the speed of a plurality of vehicles on the same road section to determine the degree of congestion of the road section according to a speed value. However, the method is prone to continuous abnormal mutations when road conditions are directly determined according to the traffic speed on a single road section. The abnormal mutations result from an abnormal traffic speed. For example, an abnormal vehicle behavior results in an excessively low or high speed. That is, such road condition generation method or road condition determining method is affected by the abnormal traffic speed, causing errors in calculation or determining of road conditions, and resulting in inaccurate road conditions.

Accordingly, the embodiments of the present disclosure provide a road condition generation method, a road condition generation apparatus, a road condition generation device, and a computer-readable storage medium. In the embodiments of the present disclosure, current driving state information is obtained; for the current driving state information, road condition state information is generated according to transition information between road condition states extracted from historical road condition data and a correspondence between road condition states and road section traffic capacity information; and the road condition state information is outputted. In this way, the continuous abnormal mutations that easily occur when road conditions are directly determined according to the traffic speed on a single road section can be avoided. The transition information between road condition states extracted from the historical road condition data and the correspondence between road condition states and road section traffic capacity information ensure a smooth transition between road condition states in a geospatial sequence.

Thus, embodiments of the present disclosure resolve the technical problem that the foregoing road condition generation method or road condition determining method is affected by the abnormal traffic speed, causing errors in the calculation or determining of road conditions, and resulting in inaccurate road conditions. Moreover, the embodiments of the present disclosure also resolve the technical problems of a large amount of work, a narrow road coverage, and difficulty in covering other roads except highways or city expressways in a case that sensors or coils are deployed on roads by a traffic control department and a traffic flow is sensed by using the sensors to determine traffic congestion conditions.

For better understanding of a road condition generation method, a road condition generation apparatus, and a road condition generation device provided by the embodiments of the present disclosure, a system architecture of the road condition generation method applicable to the embodiments of the present disclosure is described below. FIG. 1 is a schematic diagram of a system architecture of a road condition generation method according to an embodiment of the present disclosure.

As shown in FIG. 1, the system architecture may include one or more servers and a plurality of terminals (or devices). The server may include, but is not limited to, a backend server, a component server, a road condition generation server or the like. The server can communicate with a plurality of terminals by using the Internet. The server can perform road condition analysis, traffic warning, path planning, and the like, can display road conditions on any platform or product that provides real-time traffic conditions, for example, a digital large screen, a map service application, ride-hailing software, and a logistics scheduling system, and can dynamically display changes in the road conditions for the terminal in real time, to facilitate planning, scheduling, and decision making of a user.

A related client may be installed and run on the terminal (or device). The client (such as a map service client) refers to a program that corresponds to the server and provides a local service for a customer. The local service herein may include, but is not limited to, road condition analysis, traffic warning and path planning.

Specifically, the client may include: an application running locally, a function running on a network browser (which is also referred to as a Web App), an applet embedded in an e-mail, an applet embedded in instant messaging client software, a function embedded in another application (for example, an application account applied for by a developer or vendor based on a public platform) or the like. For the client, a corresponding server-end program needs to be run on the server to provide a corresponding service, such as a database service, data computing and decision execution. A user performs a related operation for traffic conditions on the corresponding platform by using the terminal, for example, checking road conditions or planning paths.

For example, in a map service client, the server uses real-time traffic condition information as a fundamental function, and transmits the traffic condition information to the map service client on a user side. By using the map service client installed and run on the terminal, a user can easily know about the degree of road congestion, plan travel routes and properly arrange travel plans. Moreover, the map service client can also help a traffic control department build a traffic warning system and carry out dispatching in an urban transportation system.

The terminal in the embodiments of the present disclosure may include any handheld electronic product based on an intelligent operating system, and can perform human-computer interaction with users by using a keyboard, a virtual keyboard, a touch pad, a touch screen, a voice-activated device or another input device. For example, the terminal may be a smart phone, a tablet computer or a personal computer. The intelligent operating system includes any operating system that provides a variety of mobile apps to a mobile device to enrich device functions, for example, Android, IOS or Windows Phone.

Further, the system architecture of the road condition generation method provided by the embodiments of the present disclosure may also include another device, such as a third-party server configured to collect statistics about, acquire or store current driving state information or the like, so that when needing to generate road conditions, the road condition generation server obtains the current driving state information and the like from the third-party server.

Figure 2:
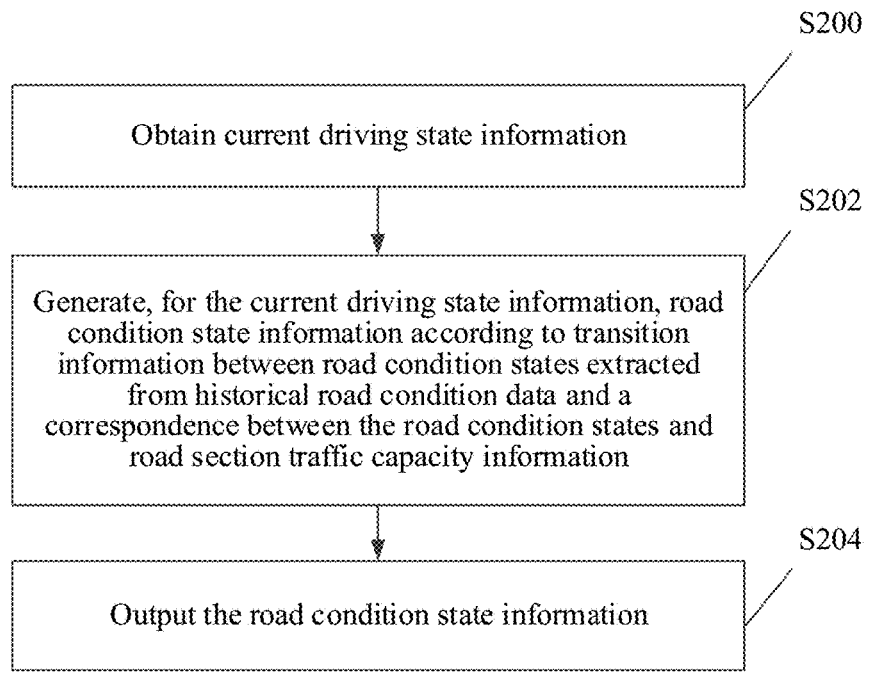
FIG. 2 is a schematic flowchart of a road condition generation method according to an embodiment of the present disclosure.

Based on the system architecture of the road condition generation method shown in FIG. 1, FIG. 2 is a schematic flowchart of a road condition generation method according to an embodiment of the present disclosure. Generation of road condition information is described from a server side (that is, a road condition generation apparatus or device), and may include the following steps.

S200: Obtain current driving state information.

Specifically, the current driving state information in the embodiments of the present disclosure may include the type of a current road on which a vehicle runs (for example, the road type may be categorized according to road section speed limit information), traffic accident information of the current road, traffic control information of the current road, state information of a current driver (which may include driving experience information, driving habit information, or the like), which are configured to represent condition information of a current driving scene or the current driver, or condition information of the current driving scene and the current driver.

Further, the current driving state information may include current driving scene information and driving behavior state information of a driver.

The current driving scene information, that is, variation information of road conditions, is usually caused by attributes of facilities around the road. The current driving scene information objectively limits a traffic capacity of a particular road section. The current driving scene information in the embodiments of the present disclosure may include at least one of the followings: vehicle positioning information, road section speed limit information (for example, whether the road section is a highway, an entrance/exit ramp, or an urban express road), traffic control information, traffic accident information, a traffic light road section or not, a tunnel road section or not, a subway exit road section or not, and a ground-level road or not, an overpass road section or not, or the like.

The driving behavior state information of the driver, equivalent to personal driving information of the driver (which is usually a person), is obtained from driving behaviors of the driver, and results in different vehicle speeds to some extent. The driving behavior state information of the driver in the embodiments of the present disclosure may include at least one of the followings: driving experience information of the driver, whether the driver parks abnormally, and driving habit information (for example, whether the driver likes racing, whether the user overtakes often, or whether the driver often follows another car).

The server may obtain the current driving state information in various ways. For example, the server may be provided with a database configured to collect statistics about, acquire or store road scene information and behavior state information of different drivers, and the server can directly extract the current driving state information from the database when current road section traffic capacity information needs to be generated according to the current driving state information. Alternatively, if the current driving state information is saved on a third-party device (such as a third-party server), when the current road section traffic capacity information needs to be generated according to the current driving state information, the current driving state information can be obtained from the third-party device.

S202: Generate, for the current driving state information, road condition state information according to transition information between road condition states extracted from historical road condition data and a correspondence between road condition states and road section traffic capacity information.

Specifically, the current road section traffic capacity information in the embodiments of the present disclosure is information for representing a current traffic capacity of a road or a road section, and may include at least one of the followings: a traffic speed, a traffic flow, an average passage time, a traffic light waiting period, or the like.

Using the traffic speed as an example, the current road section traffic capacity information may be 50 km/h to 60 km/h, or 40 km/h to 50 km/h. Using the traffic flow as an example, the current road section traffic capacity information may be 50 vehicles/hour/lane to 70 vehicles/hour/lane, or 200 vehicles/hour/lane to 220 vehicles/hour/lane. Using the average passage time as an example, the current road section traffic capacity information may be 35 sec/km to 40 sec/km, or 300 sec/km to 350 sec/km. Using the traffic light waiting period as an example, the current road section traffic capacity information may be one signal period, two signal periods, or the like.

The road condition state in the embodiments of the present disclosure may include congestion, slow movement, smooth movement, or the like. The transition information between road condition states is information about a transition of a road condition state from a first state to a second state, for example, transition probability information of a transition from congestion to slow movement, or transition probability information of a transition from smooth movement flow to slow movement. The correspondence between road condition states and road section traffic capacity information may be as follows: the congestion state corresponds to 1 km/h to 5 km/h, or the congestion state corresponds to 50 vehicles/hour/lane to 70 vehicles/hour/lane, or the smooth movement state corresponds to 60 km/h to 70 km/h, and the like.

In this case, S202 may specifically include: obtaining historical road condition data first; then analyzing the historical road condition data; extracting transition information between road condition states and a correspondence between each road condition state and road section traffic capacity information by using a preset extraction algorithm; and storing the transition information between road condition states and the correspondence between each road condition state and road section traffic capacity information. After the current driving state information is obtained, the current road condition state information is generated for the current driving state information according to the stored transition information between road condition states and the correspondence between each road condition state and road section traffic capacity information.

S204: Output the road condition state information.

In the embodiments of the present disclosure, current driving state information is obtained; for the current driving state information, road condition state information is generated according to transition information between road condition states extracted from historical road condition data and a correspondence between road condition states and road section traffic capacity information; and the road condition state information is outputted. In this way, continuous abnormal mutations that easily occur when road conditions are directly determined according to a traffic speed on a single road section can be avoided. The transition information between road condition states extracted from the historical road condition data and the correspondence between road condition states and road section traffic capacity information ensure a smooth transition between road condition states in a geospatial sequence.

Thus, the embodiments of the present disclosure resolve the technical problem that the conventional road condition generation method or road condition determining method is affected by an abnormal traffic speed, causing errors in the calculation or determining of road conditions, and resulting in inaccurate road conditions. Moreover, the embodiments of the present disclosure also resolve the technical problems of a large amount of work, a narrow road coverage, and difficulty in covering other roads except highways or city expressways in a case that sensors or coils are deployed on roads by a traffic control department and a traffic flow is sensed by using the sensors to determine traffic congestion conditions.

In an embodiment of the present disclosure, S202 can be implemented in the following way.

After the current driving state information is obtained, current road section traffic capacity information may be first generated according to the current driving state information.

After obtaining the current driving state information, the server may generate current road section traffic capacity information according to a related current road section traffic capacity information algorithm. For example, if the current road section traffic capacity information is the traffic speed, the server may calculate a current traffic speed of the road section with reference to vehicle positioning information, road section speed limit information and whether or not a driver parks abnormally, where each of parameters may correspond to a respective weight coefficient.

Then, the current road section traffic capacity information is discretized to obtain an observation sequence.

Specifically, the observation sequence in the embodiments of the present disclosure is a visible random sequence in the field of the hidden Markov model (HMM). The hidden Markov model is a probability model about sequences, and describes a process in which a hidden Markov chain randomly generates an unobservable state random sequence, and an observation random sequence is generated from observations generated by all states. The state random sequence randomly generated by the hidden Markov model is referred to as a state sequence; the observation random sequence generated from the observation generated by each state is referred to as an observation sequence. For example, if the current road section traffic capacity information is the traffic speed, a range to which the traffic speed belongs may be used as the observation sequence, and after discretization, and ACBDFE sequence is generated, where A-[0,10], B-(10, 20], C-(20,40], D-(40,60], E-(60,70], F-(70,80] and G-(80, 120].

Finally, the observation sequence is inputted to the hidden Markov model, to generate a road condition state sequence.

Specifically, the hidden Markov model in the embodiments of the present disclosure includes a first probability matrix and a second probability matrix of road sections extracted from the statistical historical road condition data. The first probability matrix is used for indicating transition probabilities between road condition states, and the second probability matrix is used indicating a correspondence, determined in a probability form, between road condition states and road section traffic capacity information.

In the embodiments of the present disclosure, a state sequence with an invisible model is to be obtained; therefore, a specific model and an observation sequence need to be known. The specific model may be a hidden Markov model, which includes an initial road condition state probability distribution, the first probability matrix (such as a road condition state transition probability matrix) and the second probability matrix (such as an output probability matrix from road condition states to observations or an observation probability matrix). The observation sequence is obtained by discretizing a real-time description of a road section traffic capacity in S202, and may be, for example, the sequence ACBDFE to which the range of traffic speed belongs. Output of the model is a final road condition state sequence, that is, a road condition state sequence corresponding to the maximum probability for the given observation sequence. For example, a road condition state sequence along a traffic flow direction is: congestion/slow movement/congestion/smooth movement/smooth movement/smooth movement.

Usually, $\lambda=(A,B,\pi)$ triplet is used to briefly represent a hidden Markov model. The hidden Markov model may be described by five elements, including two state sets and three probability matrices:

1. Hidden States S

These states satisfy the Markov property, and are states actually hidden in the Markov model. These states (such as S1, S2, and S3) usually cannot be obtained through direct observation.

2. Observable States O

These states are associated with the hidden states in the model, and can be obtained through direct observation (for example O1, O2 or O3, and the quantity of the observable states is not necessarily equal to the quantity of the hidden states.).

3. Initial State Probability Matrix $\pi$

It represents a probability matrix of the hidden states at an initial moment t=1, for example, when t=1, P(S1)=p1, P(S2)=p2, P(S3)=p3, and the initial state probability matrix $\pi$=[p1 p2 p3].

4. Hidden State Transition Probability Matrix A

It describes transition probabilities between states in the HMM.

$Aij=P(Sj|Si), 1 \leq i,j \leq N.$

The formula represents a probability of state Sj at moment t+1 under the condition that the state is Si at moment t.

5. Observation State Transition Probability Matrix B

If N represents the quantity of hidden states and M represents the quantity of observable states, then $Bij=P(Oi|Sj), 1 \leq i \leq M, 1 \leq j \leq N.$ The formula represents a probability of an observation state Oi under the condition that the hidden state is Si at moment t.

Then, if an observation sequence and a model parameter $\lambda=(A,B,\pi)$ are given, how to calculate a probability of an observation sequence effectively so as to make a related evaluation on the HMM needs to be addressed. In embodiments of the present disclosure, a Viterbi algorithm may be used, that is, a path with a maximum probability (an optimal path) is calculated by dynamic planning, and one path corresponds to one road condition state sequence.

In the embodiments of the present disclosure, the most reasonable road condition state sequence is generated in combination with a labeling problem (that is, a prediction problem in which both an input variable and an output variable are variable sequences) and the hidden Markov model formed by the first probability matrix and the second probability matrix of road sections extracted according to the statistical historical road condition data. A large amount of accurate historical road condition information is of great importance to road condition generation, and the generated road condition state sequence can be as close to the actual situation as possible.

In this way, continuous abnormal mutations that easily occur when road conditions are directly determined according to a traffic speed on a single road section can be avoided. Statistical transition probabilities between road condition states in the historical road condition data ensure a smooth transition between road condition states in a geospatial sequence. The present disclosure resolve the technical problem that the conventional road condition generation method or road condition determining method is affected by an abnormal traffic speed, causing errors in the calculation or determining of road conditions, and resulting in inaccurate road conditions. Moreover, the present disclosure also resolve the technical problems of a large amount of work, a narrow road coverage, and difficulty in covering other roads except highways or city expressways in a case that sensors or coils are deployed on roads by a traffic control department and a traffic flow is sensed by using the sensors to determine traffic congestion conditions.

Figure 3:
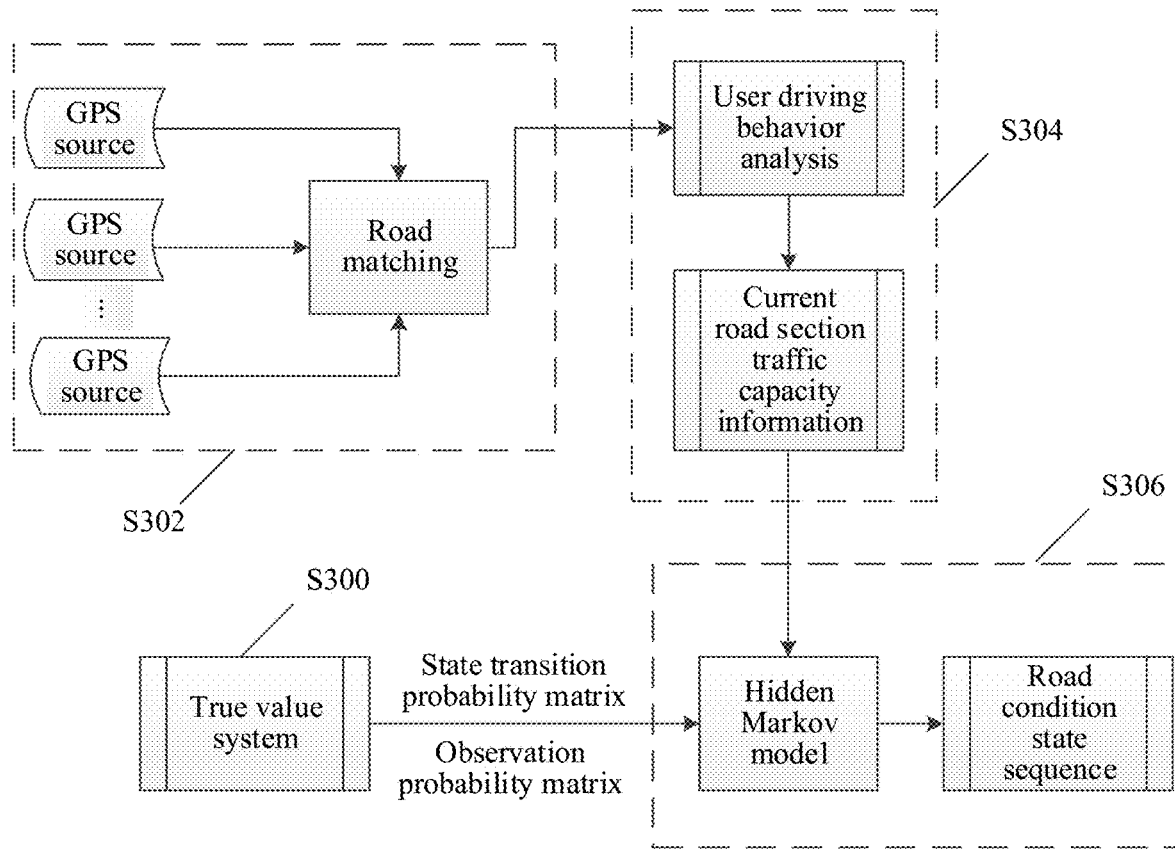
FIG. 3 is a schematic diagram of a principle of road condition generation according to an embodiment of the present disclosure.

Further, with reference to the schematic diagram of a principle of road condition generation according to an embodiment of the present disclosure shown in FIG. 3, the road condition generation method provided in the embodiments of the present disclosure is described in detail again. According to FIG. 3, the principle of road condition generation can be divided into the followings.

S300: A server (or a road condition generation apparatus or device) obtains statistical historical road condition data from a true value system in which actual traffic conditions are recorded, then extracts transition probabilities between the road condition states according to the statistical historical road condition data, and determines, according to the statistical historical road condition data, a correspondence between road condition states and road section traffic capacity information in a probability form.

S302: Acquire positioning information of a vehicle that performs positioning and navigation on a road system, obtain driving behavior state information of a driver corresponding to the vehicle according to a vehicle identifier, and associate the positioning information and the obtained driving behavior state information of the driver with a road section in road network data.

S304: Generate current road section traffic capacity information according to current driving state information.

S306: Generate a road condition state sequence according to a hidden Markov model.

Figure 4:
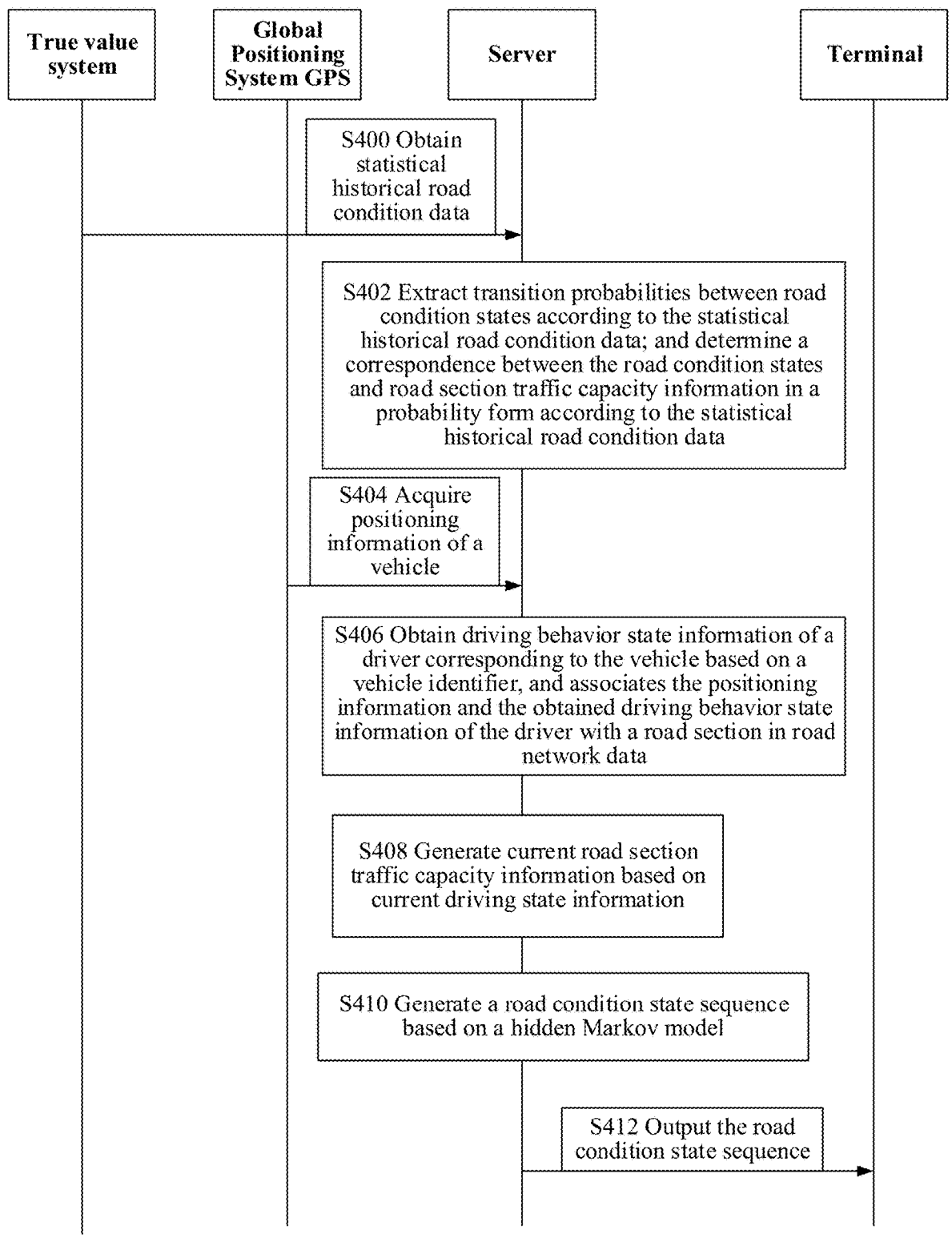
FIG. 4 is a schematic diagram of a principle of a state transition of a hidden Markov model according to an embodiment of the present disclosure.

Specifically, with reference to the schematic flowchart of another embodiment of a road condition generation method according to the present disclosure shown in FIG. 4, the principle of road condition generation provided by the embodiments of the present disclosure is described in detail. The road condition generation method shown in FIG. 4 includes the following steps:

S400: A server (or a road condition generation apparatus or device) obtains statistical historical road condition data from a true value system in which actual traffic conditions are recorded.

S402: The server extracts transition probabilities between road condition states according to the statistical historical road condition data, and determines, according to the statistical historical road condition data, a correspondence between road condition states and road section traffic capacity information in a probability form.

Figure 5:
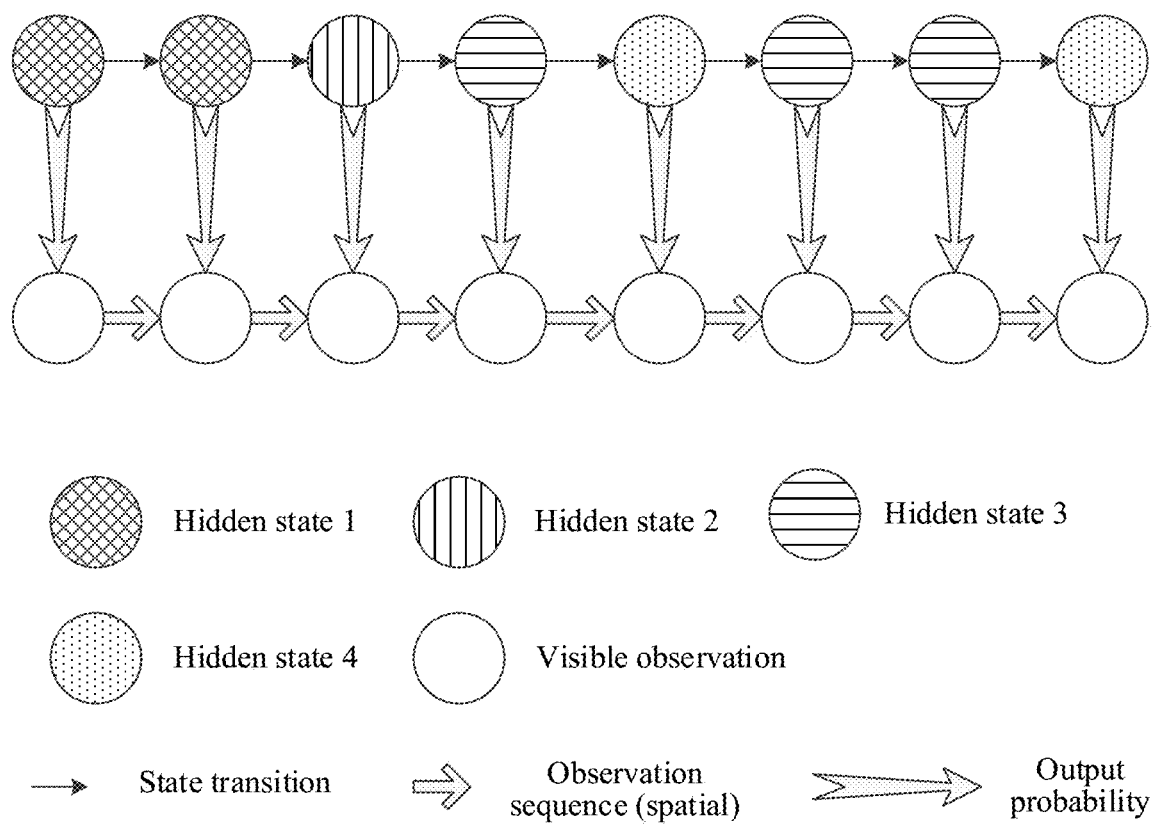
FIG. 5 is a schematic flowchart of another embodiment of a road condition generation method according to the present disclosure.

Specifically, FIG. 5 is a schematic diagram of a principle of a state transition of a hidden Markov model according to an embodiment of the present disclosure. The server may collect statistics about a road condition state transition probability matrix and an observation probability matrix used for the hidden Markov model from a large amount of accurate historical road condition information returned by true value systems such as road test verification, internal feedback, manual labeling and machine measurement. A large amount of accurate historical road condition information is of great importance to road condition generation, and determines two of the three elements of the hidden Markov model: the road condition state transition probability matrix and the observation probability matrix. O1, O2, O3 . . . , O8 in FIG. 5 are visible observation states (or observable states).

For example, it is assumed that the road condition states include smooth movement, slow movement and congestion. Based on a large amount of accurate historical road condition information, a statistical probability distribution of road condition changes (that is, the road condition state transition probability matrix) is as shown in Table 1 below.

TABLE 1

|  | Smooth movement | Slow movement | Congestion |
| --- | --- | --- | --- |
| Smooth movement | 0.6 | 0.25 | 0.15 |
| Slow movement | 0.3 | 0.35 | 0.35 |
| Congestion | 0.2 | 0.38 | 0.42 |

Table 1 shows that, in actual traffic conditions, in adjacent sections along a traffic flow direction, the probability of transition from smooth movement to slow movement is 0.25, the probability of transition from slow movement to congestion is 0.35, and the probability of transition from congestion to smooth movement is 0.20. In the embodiments of the present disclosure, statistical road condition state transition probabilities in the historical road condition data ensure a smooth transition between road condition states in a geospatial sequence, and to a certain extent, allow errors caused by traffic speed calculation. Thus, the embodiments of the present disclosure resolve the technical problem that the conventional road condition generation method or road condition determining method is affected by an abnormal traffic speed, causing errors in the calculation or determining of road conditions, and resulting in inaccurate road conditions, and can enhance system tolerance for abnormal noise.

In addition, the determining, according to the statistical historical road condition data, a correspondence between road condition states and road section traffic capacity information in a probability form may specifically include: determining, according to the statistical historical road condition data in combination with information about a plurality of different road scenes, the correspondence between road condition states and road section traffic capacity information in a probability form.

For example, based on a large amount of accurate historical road condition data, statistics about a probability distribution of road condition states and traffic speeds (that is, the observation probability matrix) are collected from actual traffic conditions, which may be shown in Table 2 below.

TABLE 2

|  | [0, 10] | (10, 20] | (20, 40] | ... | (60, 70] | (70, 80] | (80, 120] |
|---|---|---|---|---|---|---|---|
| Smooth movement | 0.001 | 0.02 | 0.05 | ... | 0.32 | 0.2 | 0.15 |
| Slow Movement | 0.08 | 0.22 | 0.46 | ... | 0.008 | 0.003 | 0 |
| Congestion | 0.26 | 0.38 | 0.15 | ... | 0.003 | 0.002 | 0.001 |

Table 2 shows that the probability of the actual traffic speed being in a range of (60, 70] km/h during smooth movement is 0.32, and the probability of the actual traffic speed being in a range of (20, 40] km/h during congestion is 0.15. Specifically, reasons such as lack of a data source, incomplete analysis of user driving behaviors, or other unknown anomalies may result in inconsistency between the calculated real-time description of the road section traffic capacity and the actual road conditions. Moreover, different scenes also result in different road conditions. In the embodiments of the present disclosure, the correspondence between road condition states and real-time descriptions of road section traffic capacities is determined in a probability form according to the statistics of the historical data. In this way, the corresponding observation noise information is tolerated to some extent; moreover, diversified requirements of road condition determining scenes can be satisfied by extending a state set, and more roads are covered. The embodiments of the present disclosure are applicable to highways, city expressways, and roads of other grades, so that spread channels of road conditions in a case of a traffic accident or traffic control are taken into consideration effectively.

For example, states of a road section are collected 100 times, among which 98 states are smooth movement, and two states are congestion. Congestion of the road section can be considered as observational noise, and from the perspective of probability, the probability of smooth movement is high and the probability of congestion is low. Therefore, the congestion can almost be ignored, that is, corresponding observational noise information can be tolerated. In addition, different road condition scenes can be extended, such as a high-speed road section, a community road section or a traffic light road section. Parameters of smooth movement, slow movement, and congestion in different road condition scenes may be different. For example, a high-speed road section with a traffic speed over 60 km/h or 70 km/h can be considered as a clear road section, and a traffic light road section with a traffic speed over 30 km/h or 40 km/h can be considered as a clear road section. Therefore, diversified needs of road condition determining scenes can be satisfied.

S404: The server acquires positioning information of a vehicle that performs positioning and navigation on a road system.

S406: The server obtains driving behavior state information of a driver corresponding to the vehicle according to a vehicle identifier, and associates the positioning information and the obtained driving behavior state information of the driver with a road section in road network data.

Specifically, GPS positioning data on a device of a vehicle can be acquired as long as the vehicle has a continuous driving behavior or is in a navigation process, for example, map application software in navigation, a driver transporting a passenger, a logistics vehicle carrying goods, and many branded private cars on the move. The GPS positioning data includes a road section where the vehicle is located (that is, vehicle location information), a moving speed of the vehicle, and other information. After the GPS positioning data is obtained, the GPS positioning data is linked with driving behaviors of a driver according to the vehicle identifier (ID). In other words, an ID of each vehicle and driver information corresponding to the ID of each vehicle may be set. The driver information may include driving behavior state information of a driver. In this case, after the GPS positioning data is obtained, the GPS positioning data may be linked to the corresponding driving behavior state information of the driver according to the vehicle ID, and then a GPS point (that is, the vehicle location information) can be associated to an actual road section in the road network data by using a corresponding road matching algorithm, so as to further analyze the driving behavior of the user in a specific scene.

S408: The server generates current road section traffic capacity information according to current driving state information.

Specifically, the current driving state information can be obtained through analysis according to road section information after the association (which may also be collectively referred to as user driving behavior analysis, or driver driving behavior analysis). The current driving state information may include the current driving scene information and driving behavior state information of the driver. For details, refer to S200 in the embodiment of FIG. 2, which is not repeated herein. The generated current road section traffic capacity information is discretized to obtain an observation sequence.

In an embodiment of the present disclosure, S404 and S406 may be integrated into S408. That is, the generating current road section traffic capacity information according to current driving state information in S408 may specifically include: acquiring positioning information of a vehicle that performs positioning and navigation on a road system, obtaining driving behavior state information of a driver corresponding to the vehicle according to a vehicle identifier, and associating the positioning information and the obtained driving behavior state information of the driver with a road section in road network data.

S410: Generate a road condition state sequence according to a hidden Markov model.

Specifically, the server generates, according to the inputted observation sequence, an initial road condition state probability distribution, a first probability matrix and a second probability matrix, a road condition state sequence corresponding to a path with a maximum probability by using dynamic planning, and generates a road condition state sequence, to instruct to display the path with the maximum probability in a map according to the road condition state sequence. The road condition state sequence indicates road condition information of each road section in the path with the maximum probability. Specifically, reference may be made to S204 in FIG. 2, and details are not described herein again.

S412: Output the road condition state sequence.

Specifically, the server can transmit the road condition state sequence to a terminal, so that the terminal can display a smooth degree or congestion degree of road conditions in map software according to the road condition state sequence. Specifically, road conditions may be shown in different colors. For example, a green road section indicates the road section is clear, a yellow road section indicates that the road section has a slow movement speed, and a bright-red road section indicates that the road section is congested, and the brown-red road section indicates that the road section is heavily congested. Alternatively, according to the road condition state sequence, the server can help a user plan an optimal path from the start to the end (that is, a path with a maximum probability), display a smooth degree or congestion degree of each road section of the optimal path, and display a passage time of the optimal path.

In the embodiments of the present disclosure, current road section traffic capacity information is generated according to current driving state information; then an observation sequence obtained by discretizing the current road section traffic capacity information is inputted to a hidden Markov model, to generate a road condition state sequence.

The hidden Markov model includes a first probability matrix and a second probability matrix of road sections extracted according to statistical historical road condition data. The first probability matrix is used for indicating transition probabilities between road condition states, and the second probability matrix is used for indicating that a correspondence between road condition states and road section traffic capacity information is determined in a probability form. In this way, continuous abnormal mutations that occur easily when road conditions are directly determined according to a traffic speed on a single road section can be avoided. Statistical road condition state transition probabilities in the historical road condition data ensure a smooth transition between road condition states in a geospatial sequence, and to a certain extent, allow errors caused by traffic speed calculation. Thus, the embodiments of the present disclosure resolve the technical problem that the conventional road condition generation method or road condition determining method is affected by an abnormal traffic speed, causing errors in the calculation or determining of road conditions, and resulting in inaccurate road conditions, and can enhance system tolerance for abnormal noise. Moreover, the embodiments of the present disclosure also resolve the technical problems of a large amount of work, a narrow road coverage, and difficulty in covering other roads except highways or city expressways in a case that sensors or coils are deployed on roads by a traffic control department and a traffic flow is sensed by using the sensors to determine traffic congestion conditions.

In the embodiments of the present disclosure, from the perspective of a labeling problem and a probability generation model, a hidden Markov model is used for a given observation sequence. An optimal road condition state sequence is generated based on transition probabilities between invisible road conditions and the observation probability adapted to multiple scenarios, so that the road condition release is more reasonable and more in line with the actual situation, and covers more roads. The embodiments of the present disclosure are applicable to highways, city expressways, and roads of other grades, so that spread channels of road conditions in a case of a traffic accident or traffic control are taken into consideration effectively. Moreover, the solution is flexible, thus overcoming the shortcoming of imbalance of strategy optimization during addressing of a bad case (BadCase). The embodiments of the present disclosure can provide a better ETA service and better path planning by providing accurate road conditions, thus saving urban road resources and saving time for users.

Figure 6A:
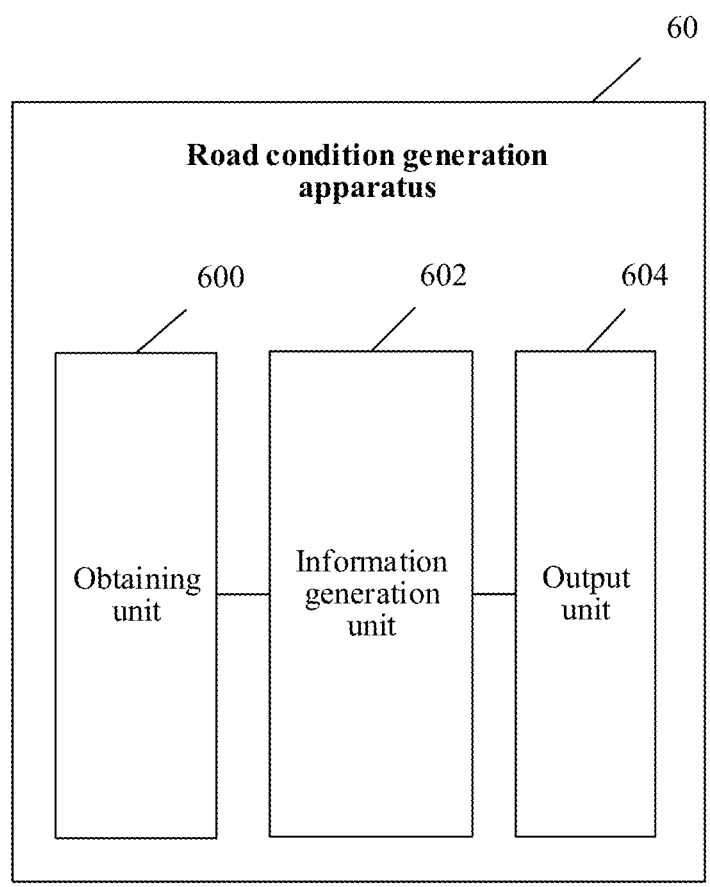
FIG. 6A is a schematic structural diagram of a road condition generation apparatus according to an embodiment of the present disclosure.

The embodiments of the present disclosure further provide a road condition generation apparatus and a road condition generation device, which are described in detail below FIG. 6A is a schematic structural diagram of a road condition generation apparatus according to an embodiment of the present disclosure. As shown in FIG. 6A, the road condition generation apparatus 60 may include units for implementing the road condition generation method in the foregoing embodiments. Specifically, the road condition generation apparatus 60 may include: an obtaining unit 600, an information generation unit 602 and an output unit 604.

The obtaining unit 600 is configured to obtain current driving state information.

The information generation unit 602 is configured to generate, for the current driving state information, road condition state information according to transition information between road condition states extracted from historical road condition data and a correspondence between road condition states and road section traffic capacity information.

The output unit 604 is configured to output the road condition state information.

Figure 6B:
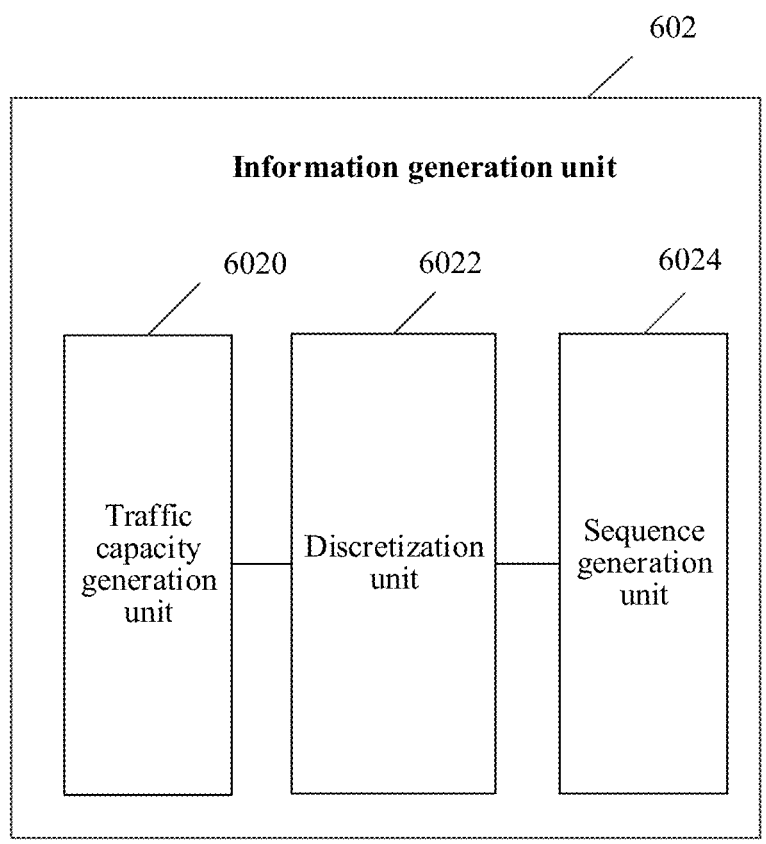
FIG. 6B is a schematic structural diagram of an information generation unit according to an embodiment of the present disclosure.

Specifically, FIG. 6B is a schematic structural diagram of an information generation unit according to an embodiment of the present disclosure. As shown in FIG. 6B, the information generation unit 602 may include: a traffic capacity generation unit 6020, a discretization unit 6022 and a sequence generation unit 6024.

The traffic capacity generation unit 6020 is configured to generate current road section traffic capacity information according to the current driving state information.

The discretization unit 6022 is configured to discretize the current road section traffic capacity information to obtain an observation sequence.

The sequence generation unit 6024 is configured to: input the observation sequence to a hidden Markov model, and output a road condition state sequence. The hidden Markov model includes a first probability matrix and a second probability matrix of road sections extracted according to statistical historical road condition data. The first probability matrix is used for indicating transition probabilities between road condition states, and the second probability matrix is used for indicating that a correspondence between road condition states and road section traffic capacity information is determined in a probability form.

The current driving state information includes current driving scene information and driving behavior state information of a driver.

The current driving scene information includes at least one of the followings: vehicle positioning information, road section speed limit information, traffic control information, traffic accident information, a traffic light road section or not, a tunnel road section or not, a subway exit road section or not, and a ground-level road or not.

The driving behavior state information of the driver includes at least one of the followings: driving experience information of the driver, whether the driver parks abnormally, and driving habit information.

Figure 7:
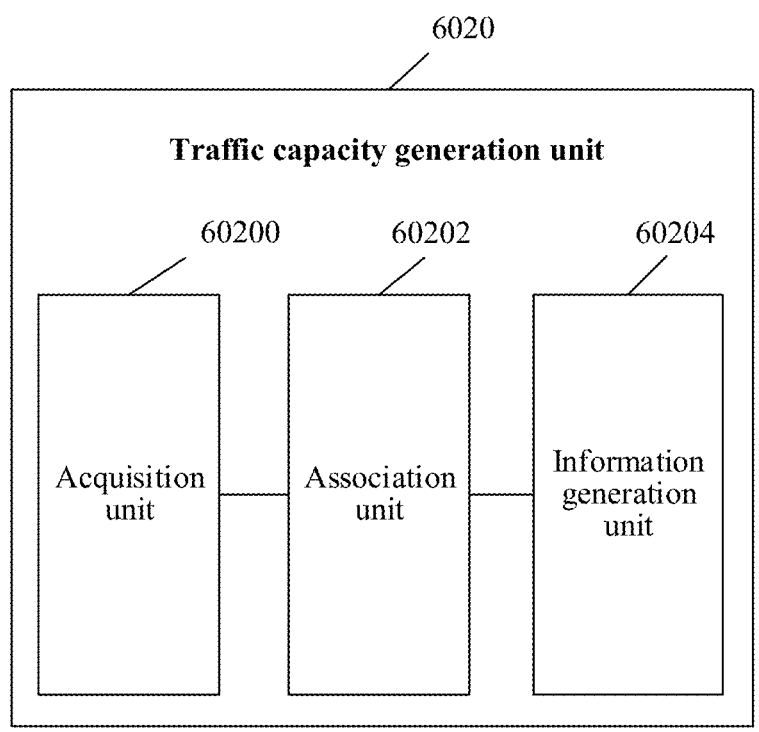
FIG. 7 is a schematic structural diagram of a traffic capacity generation unit according to an embodiment of the present disclosure.

FIG. 7 is a schematic structural diagram of a traffic capacity generation unit 6020 according to an embodiment of the present disclosure. As shown in FIG. 7, the traffic capacity generation unit 6020 may include an acquisition unit 60200, an association unit 60202 and an information generation unit 60204.

The acquisition unit 60200 is configured to acquire positioning information of a vehicle that performs positioning and navigation on a road system.

The association unit 60202 is configured to: obtain driving behavior state information of a driver corresponding to the vehicle according to a vehicle identifier, and associate the positioning information and the obtained driving behavior state information of the driver with a road section in road network data.

The information generation unit 60204 is configured to generate the current road section traffic capacity information according to road section information after the association.

The current road section traffic capacity information includes at least one of the followings: a traffic speed, a traffic flow, an average passage time, and a traffic light waiting period.

Specifically, the road condition generation apparatus 60 may further include an obtaining unit, a first extraction unit and a second extraction unit.

The obtaining unit is configured to obtain the statistical historical road condition data from a true value system in which actual traffic conditions are recorded.

The first extraction unit is configured to extract the transition probabilities between road condition states according to the statistical historical road condition data.

The second extraction unit is configured to determine, according to the statistical historical road condition data, the correspondence between road condition states and road section traffic capacity information in a probability form. Specifically, according to the statistical historical road condition data in combination with information about a plurality of different road scenes, the correspondence between road condition states and the road section traffic capacity information is determined in a probability form.

Further, the sequence generation unit 6024 is specifically configured to: generate, according to the input observation sequence, an initial road condition state probability distribution, the first probability matrix and the second probability matrix, a road condition state sequence corresponding to a path with a maximum probability by using dynamic planning; and output the road condition state sequence, to instruct to display the path with the maximum probability in a map according to the road condition state sequence, the road condition state sequence indicating road condition information of each road section in the path with the maximum probability.

For functions of the modules in the road condition generation apparatus 60 in the embodiments of the present disclosure, refer to a specific implementation of any embodiment in FIG. 1 to FIG. 5 in the foregoing method embodiments, and details are not described herein again. The road condition generation apparatus 60 may be a server or another computing device, and includes a computer, or the like.

Figure 8:
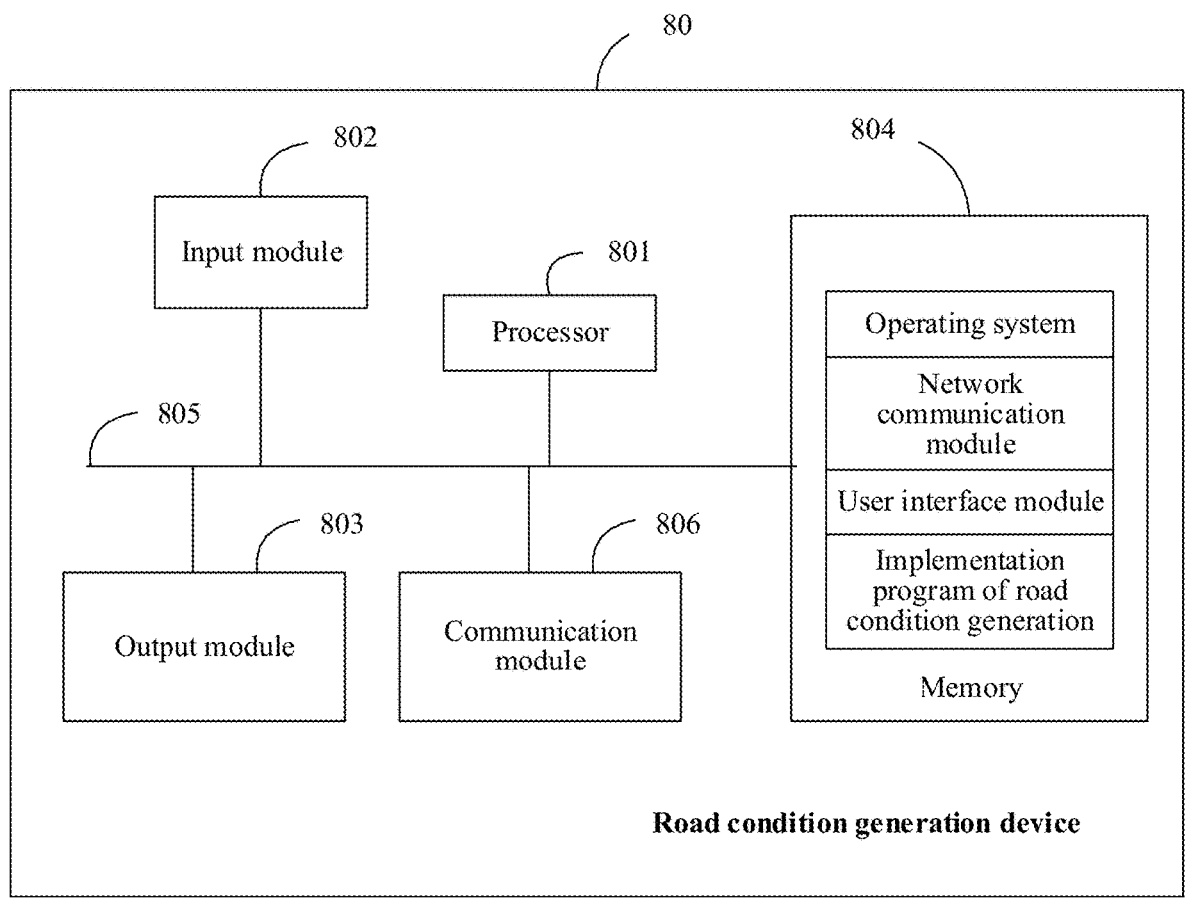
FIG. 8 is a schematic structural diagram of a road condition generation device according to an embodiment of the present disclosure.

Further, FIG. 8 is a schematic structural diagram of a road condition generation device according to an embodiment of the present disclosure. As shown in FIG. 8, the road condition generation device 80 may include: at least one processor 801, such as CPU, an input module 802, an output module 803, a memory 804, at least one communications bus 805 and a communication module 806. The communications bus 805 is configured to implement connection and communication between these components. The memory 804 may be a high-speed RAM, or may be a non-volatile memory, for example, at least one magnetic disk memory. The memory 804 includes a flash in the embodiments of the present disclosure. In some embodiments of the present disclosure, the memory 804 may further be at least one storage system that is located away from the processor 801. The communication module 806 is configured to perform data communication with external devices. As shown in FIG. 8, the memory 804, as a computer storage medium, may include an operating system, a network communication module, a user interface module, and an implementation program of road condition generation.

In the road condition generation device 80 as shown in FIG. 8, the processor 801 may be configured to invoke the implementation program of road condition generation stored in the memory 804, and perform: obtaining current driving state information by using the communication module 806; generating, for the current driving state information, road condition state information according to transition information between road condition states extracted from historical road condition data and a correspondence between road condition states and road section traffic capacity information; and outputting the road condition state information by using the output module 803.

Specifically, the processor 801 generating, for the current driving state information, road condition state information according to transition information between road condition states extracted from historical road condition data and a correspondence between road condition states and road section traffic capacity information may include: generating current road section traffic capacity information according to the current driving state information; discretizing the current road section traffic capacity information to obtain an observation sequence; and inputting the observation sequence to a hidden Markov model, and generating a road condition state sequence, where the hidden Markov model includes a first probability matrix and a second probability matrix of road sections extracted according to statistical historical road condition data, the first probability matrix is used for indicating transition probabilities between road condition states, and the second probability matrix is used for indicating that a correspondence between road condition states and road section traffic capacity information is determined in a probability form.

Specifically, the current driving state information includes current driving scene information and driving behavior state information of a driver.

The current driving scene information includes at least one of the followings: vehicle positioning information, road section speed limit information, traffic control information, traffic accident information, a traffic light road section or not, a tunnel road section or not, a subway exit road section or not, and a ground-level road or not.

The driving behavior state information of the driver includes at least one of the followings: driving experience information of the driver, whether the driver parks abnormally, and driving habit information.

Specifically, the current driving scene information includes vehicle positioning information, and the processor 801 generating current road section traffic capacity information according to the current driving state information includes: controlling an acquisition module to acquire positioning information of a vehicle that performs positioning and navigation on a road system, where the acquisition module may be disposed on the road condition generation device 80 or another external device; obtaining driving behavior state information of a driver corresponding to the vehicle according to a vehicle identifier, and associating the positioning information and the obtained driving behavior state information of the driver with a road section in road network data; and generating the current road section traffic capacity information according to road section information after the association.

Specifically, the current road section traffic capacity information includes at least one of the followings: a traffic speed, a traffic flow, an average passage time, and a traffic light waiting period.

Specifically, before inputting the observation sequence to the hidden Markov model and generating the road condition state sequence, the processor 801 may further perform: obtaining the statistical historical road condition data from a true value system in which actual traffic conditions are recorded; extracting the transition probabilities between road condition states according to the statistical historical road condition data; and determining, according to the statistical historical road condition data, the correspondence between road condition states and road section traffic capacity information in a probability form.

Specifically, the processor 801 determining, according to the statistical historical road condition data, the correspondence between road condition states and road section traffic capacity information in a probability form includes: determining, according to the statistical historical road condition data in combination with information about a plurality of different road scenes, the correspondence between road condition states and road section traffic capacity information in a probability form.

Specifically, the processor 801 inputting the observation sequence to the hidden Markov model and generating the road condition state sequence includes: generating, according to the inputted observation sequence, an initial road condition state probability distribution, the first probability matrix and the second probability matrix, a road condition state sequence corresponding to a path with a maximum probability by using dynamic planning.

The processor 801 outputs the road condition state information by using the output module 803, including: outputting the road condition state sequence, to instruct to display the path with the maximum probability in a map according to the road condition state sequence, the road condition state sequence indicating road condition information of each road section in the path with the maximum probability.

Specifically, the road condition generation device 80 can transmit the road condition state sequence to a terminal by using the communication module 806, to instruct to display the path with the maximum probability in the map according to the road condition state sequence, the road condition state sequence indicating road condition information of each road section in the path with the maximum probability.

For functions of the modules in the road condition generation device 80 in the embodiments of the present disclosure, refer to a specific implementation of any embodiment of FIG. 1 to FIG. 5 in the foregoing method embodiments, and details are not described herein again. The road condition generation device 80 may be a server or another computing device, and may include a computer, or the like.

In the embodiments of the present disclosure, current road section traffic capacity information is generated according to current driving state information; then an observation sequence obtained by discretizing the current road section traffic capacity information is inputted to a hidden Markov model, to output a road condition state sequence. The hidden Markov model includes a first probability matrix and a second probability matrix of road sections extracted according to statistical historical road condition data. The first probability matrix is used for indicating transition probabilities between road condition states, and the second probability matrix is used for indicating that a correspondence between road condition states and road section traffic capacity information is determined in a probability form. In this way, continuous abnormal mutations that occur easily when road conditions are directly determined according to a traffic speed on a single road section can be avoided. Statistical road condition state transition probabilities in the historical road condition data ensure a smooth transition between road condition states in a geospatial sequence, and to a certain extent, allow errors caused by traffic speed calculation. Thus, the embodiments of the present disclosure resolve the technical problem that the conventional road condition generation method or road condition determining method is affected by an abnormal traffic speed, causing errors in the calculation or determining of road conditions, and resulting in inaccurate road conditions, and can enhance system tolerance for abnormal noise. Moreover, the embodiments of the present disclosure also resolve the technical problems of a large amount of work, a narrow road coverage, and difficulty in covering other roads except highways or city expressways in a case that sensors or coils are deployed on roads by a traffic control department and a traffic flow is sensed by using the sensors to determine traffic congestion conditions.

In the embodiments of the present disclosure, from the perspective of a labeling problem and a probability generation model, a hidden Markov model is used for a given observation sequence. An optimal road condition state sequence is generated based on transition probabilities between invisible road conditions and the observation probability adapted to multiple scenarios, so that the road condition release is more reasonable and more in line with the actual situation, and covers more roads. The embodiments of the present disclosure are applicable to highways, city expressways, and roads of other grades, so that spread channels of road conditions in a case of a traffic accident or traffic control are taken into consideration effectively. Moreover, the solution is flexible, thus overcoming the shortcoming of imbalance of strategy optimization during addressing of a bad case (BadCase). The embodiments of the present disclosure can provide a better ETA service and better path planning by providing accurate road conditions, thus saving urban road resources and saving time for users.

A person of ordinary skill in the art may understand that all or some of the processes of the methods in the foregoing embodiments may be implemented by a computer program instructing relevant hardware. The program may be stored in a computer-readable storage medium. When the program is run, the processes of the embodiments of the foregoing methods may be included. The storage medium may be a magnetic disk, an optical disc, a read-only memory (ROM), a random access memory (RAM) or the like.

The foregoing disclosure is merely exemplary embodiments of the present disclosure, and certainly is not intended to limit the scope of the present disclosure as defined by the claims. Therefore, equivalent variations made in accordance with the claims of the present disclosure shall fall within the scope of the present disclosure.

What is claimed is:
1. A road condition generation method for a computing device, the method comprising:
    obtaining driving state information of a first road section, the first road section being adjacent to a second road section along a traffic flow direction;
    discretizing the driving state information to obtain an observation sequence;

feeding the observation sequence to a hidden Markov model, to generate road condition state information on road condition states during a transition from the first road section to the second road section, wherein the road condition states include a first state, a second state, and a third state, wherein the first state, the second state, and the third state differ from each other in traffic speed, and wherein the road condition state information includes one or more of:
  a probability of transition from the first road section to the second road section while the first road section being of the first state and the second road section being of the second state;
  a probability of transition from the first road section to the second road section while the first road section being of the first state and the second road section being of the third state;
  a probability of transition from the first road section to the second road section while the first road section being of the second state and the second road section being of the first state;
  a probability of transition from the first road section to the second road section while the first road section being of the second state and the second road section being of the third state;
  a probability of transition from the first road section to the second road section while the first road section being of the third state and the second road section being of the first state; and
  a probability of transition from the first road section to the second road section while the first road section being of the third state and the second road section being of the second state;
determining, according to statistical historical road condition data, a correspondence between the road condition states and road section traffic capacity information in a probability form, wherein the hidden Markov model includes a first probability matrix and a second probability matrix of road sections extracted according to the statistical historical road condition data;
displaying on a user interface, a path with a maximum probability in a map according to the road condition state information; and
outputting the road condition state information.

2. The method according to claim 1, wherein the driving state information is obtained further by:
  acquiring positioning information of a vehicle;
  obtaining driving behavior state information of a driver corresponding to the vehicle; and
  generating the driving state information by associating information of the vehicle and the driver behavior state information of the driver.

3. The method according to claim 1, wherein the driving state information comprises one or more of: a traffic speed, a traffic flow, an average passage time, and a traffic light waiting period.

4. The method according to claim 1, further comprising:
  obtaining the statistical historical road condition data from a true value system in which actual traffic conditions are recorded.

5. A road condition generation device, comprising: a memory configured to store program code; an input device and an output device; and a processor connected to the input device, the output device, and the memory, and configured to execute the program code to perform:
  obtaining driving state information of a first road section, the first road section being adjacent to a second road section along a traffic flow direction;
  discretizing the driving state information to obtain an observation sequence;
  feeding the observation sequence to a hidden Markov model, to generate road condition state information on road condition states during a transition from the first road section to the second road section, wherein the road condition states include a first state, a second state, and a third state, wherein the first state, the second state, and the third state differ from each other in traffic speed, and wherein the road condition state information includes one or more of:
    a probability of transition from the first road section to the second road section while the first road section being of the first state and the second road section being of the second state;
    a probability of transition from the first road section to the second road section while the first road section being of the first state and the second road section being of the third state;
    a probability of transition from the first road section to the second road section while the first road section being of the second state and the second road section being of the first state;
    a probability of transition from the first road section to the second road section while the first road section being of the second state and the second road section being of the third state;
    a probability of transition from the first road section to the second road section while the first road section being of the third state and the second road section being of the first state; and
    a probability of transition from the first road section to the second road section while the first road section being of the third state and the second road section being of the second state;
  determining, according to statistical historical road condition data, a correspondence between the road condition states and road section traffic capacity information in a probability form, wherein the hidden Markov model includes a first probability matrix and a second probability matrix of road sections extracted according to the statistical historical road condition data;
  displaying on a user interface, a path with a maximum probability in a map according to the road condition state information; and
  outputting the road condition state information.

6. The device according to claim 5, wherein the driving state information comprises is obtained further by:
  acquiring positioning information of a vehicle;
  obtaining driving behavior state information of a driver corresponding to the vehicle; and
  generating the driving state information by associating information of the vehicle and the driver behavior state information of the driver.

7. The device according to claim 5, wherein the driving state information comprises one or more of: a traffic speed, a traffic flow, an average passage time, and a traffic light waiting period.

8. The device according to claim 5, wherein the processor is further configured to perform:
  obtaining the statistical historical road condition data from a true value system in which actual traffic conditions are recorded.

9. A non-transitory computer-readable storage medium storing computer program instructions executable by at least one processor to perform:
- obtaining driving state information of a first road section, the first road section being adjacent to a second road section along a traffic flow direction;
- discretizing the driving state information to obtain an observation sequence;
- feeding the observation sequence to a hidden Markov model, to generate road condition state information on road condition states during a transition from the first road section to the second road section, wherein the road condition states include a first state, a second state, and a third state, wherein the first state, the second state, and the third state differ from each other in traffic speed, and wherein the road condition state information includes one or more of:
  - a probability of transition from the first road section to the second road section while the first road section being of the first state and the second road section being of the second state;
  - a probability of transition from the first road section to the second road section while the first road section being of the first state and the second road section being of the third state;
  - a probability of transition from the first road section to the second road section while the first road section being of the second state and the second road section being of the first state;
  - a probability of transition from the first road section to the second road section while the first road section being of the second state and the second road section being of the third state;
  - a probability of transition from the first road section to the second road section while the first road section being of the third state and the second road section being of the first state; and
  - a probability of transition from the first road section to the second road section while the first road section being of the third state and the second road section being of the second state;
- determining, according to statistical historical road condition data, a correspondence between the road condition states and road section traffic capacity information in a probability form, wherein the hidden Markov model includes a first probability matrix and a second probability matrix of road sections extracted according to the statistical historical road condition data;
- displaying on a user interface, a path with a maximum probability in a map according to the road condition state information; and
- outputting the road condition state information.

10. The method according to claim 1, wherein the road condition state information includes two or more of:
- the probability of transition from the first road section to the second road section while the first road section being of the first state and the second road section being of the second state;
- the probability of transition from the first road section to the second road section while the first road section being of the first state and the second road section being of the third state;
- the probability of transition from the first road section to the second road section while the first road section being of the second state and the second road section being of the first state;
- the probability of transition from the first road section to the second road section while the first road section being of the second state and the second road section being of the third state;
- the probability of transition from the first road section to the second road section while the first road section being of the third state and the second road section being of the first state; and
- the probability of transition from the first road section to the second road while the first road section being of the third state and the second road section being of the second state.

11. The method according to claim 1, wherein feeding to the hidden Markov model the driving state information of the first road section to generate the road condition state information further comprises:
- generating a probability correspondence between the road condition states and traffic speed ranges, wherein the probability correspondence includes one or more of:
  - a first probability of a first traffic speed range being present during first state;
  - a second probability of a second traffic speed range being present during the first state, the second traffic speed range being different than the first traffic speed range;
  - a third probability of the first traffic speed range being present during the second state;
  - a fourth probability of the second traffic speed range being present during the second;
  - a fifth probability of the first traffic speed range being present during the third state; and
  - a sixth probability of the second traffic speed range being present during the third state.

12. The method according to claim 1, wherein feeding to the hidden Markov model the driving state information of the first road section to generate the road condition state information further comprises:
- generating a probability correspondence between the road condition states and traffic speed ranges, wherein the probability correspondence includes two or more of:
  - a first probability of a first traffic speed range being present during first state;
  - a second probability of a second traffic speed range being present during the first state, the second traffic speed range being different than the first traffic speed range;
  - a third probability of the first traffic speed range being present during the second state;
  - a fourth probability of the second traffic speed range being present during the second;
  - a fifth probability of the first traffic speed range being present during the third state; and
  - a sixth probability of the second traffic speed range being present during the third state.

* * * * *